W. H. PRITCHETT.
AUTOMATIC RIFLE.
APPLICATION FILED JULY 17, 1917.

1,297,241.

Patented Mar. 11, 1919.
6 SHEETS—SHEET 3.

Inventor
W. H. Pritchett,
by Wilkinson & Giusta,
Attorneys

UNITED STATES PATENT OFFICE.

WILLIAM H. PRITCHETT, OF THE UNITED STATES MARINE CORPS.

AUTOMATIC RIFLE.

1,297,241.  Specification of Letters Patent.  Patented Mar. 11, 1919.

Application filed July 17, 1917.  Serial No. 181,133.

*To all whom it may concern:*

Be it known that I, WILLIAM H. PRITCHETT, of the United States Marine Corps, a citizen of the United States, stationed at Santiago, in the Dominican Republic, have invented certain new and useful Improvements in Automatic Rifles; and I do hereby declare the following to be a full, clear, and exact description of the invention, such as will enable others skilled in the art to which it appertains to make and use the same.

My present invention relates to improvements in automatic rifles, and more especially to that general type of rifle which may be operated single shot by hand, or continuously automatically, as long as the supply of cartridges is maintained, under the control of a reciprocating motor piston, which is driven in the rearward direction by a portion of the powder gases, and is held in the reverse direction by a coil spring.

According to my invention, the breech bolt has an intermittent reciprocating action without being turned for locking.

The barrel is inclosed in a casing through which air is drawn by suction under the action of the powder gases, and the barrel is also preferably provided with a non-recoil arrangement, which will be hereinafter more fully described.

One of the objects of my invention is to provide an automatic rifle, which will be of simple and durable construction, with few parts likely to get out of order, and which may be adapted to stand the rough usage and exposure to the elements which are unavoidable in the use of such weapons in the field.

My invention will be more clearly understood after reference to the accompanying drawings, in which—

Fig. 3ª shows a similar section through the barrel and its casing, the motor piston being shown in elevation;

Fig. 7 is a detail view showing in plan the union piece for connecting the motor piston rod to the slide, the parts being shown on a larger scale than in the preceding figures;

Fig. 17 shows a section along the line 17—17 of Figs. 14 and 15, and looking in the direction of the arrows;

Figures 1, 2:
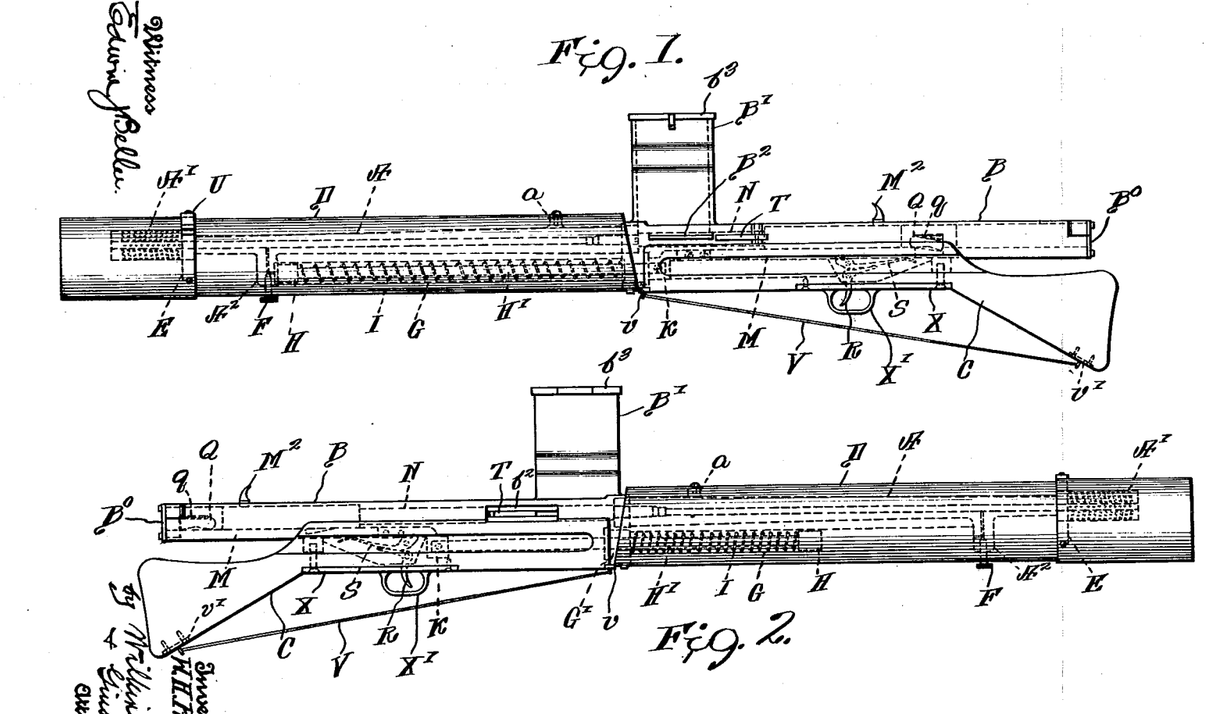
Figure 1 shows a side elevation of the complete piece as seen from the left, the breech bolt being in the closed position ready for firing.
Fig. 2 is a similar view of the opposite side of the piece, but showing the breech bolt in the rearward or open position, ready for the loading of a fresh cartridge.

The piece comprises a barrel A, whose breech end is screwed into the receiver B, fast on the stock C. The barrel is mounted in a casing D, which projects beyond the forward end thereof, as shown in Figs. 1, 2, and $3^a$, and is spaced therefrom by means of the spider E, near the muzzle, and a lug $a$ near the breech, see Figs. $3^a$ and 5.

The barrel may be provided on its forward end with a counter recoil device A', consisting of an enlargement of the barrel, having a series of openings $a'$ inclined rearward slightly, so that as the projectile is about to leave the barrel, powder gases will rush upward and slightly rearward tending to partly diminish, if not entirely counteract the recoil.

The barrel is also provided with a lug $A^2$, having a gas vent $a^2$, which is controlled by the valve F. This vent $a^2$ communicates with the vent $a^3$ opening into the end of the cylinder G, which incloses the motor piston H. This cylinder G is clamped between the lug $A^2$ and the screw block G', which is screwed into the receiver just below the barrel and through which passes the motor piston rod H', which piston rod is reciprocated in a backward direction by the powder gases, and is returned to the forward direction by the return spring I. The cylinder G is perforated as at $g$ near its forward end to permit the escape of gas when the piston nears the end of its stroke.

Figure 18:
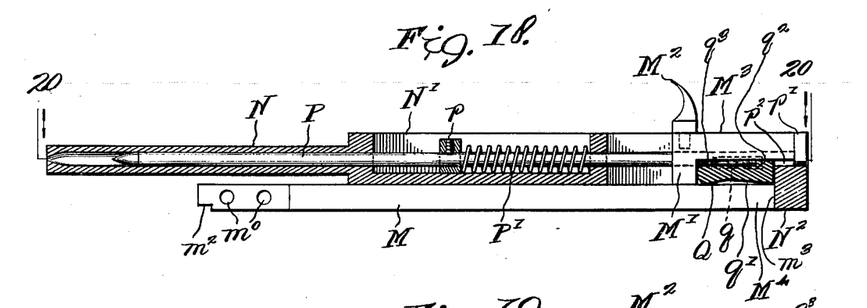
Fig. 18 shows a central vertical section through the breech bolt, with the slide carrying the cocking piece and the firing pin in elevation, the breech bolt and the firing pin being shown in the rear position.
Figures 20, 21, 22, 23, 24, 25:
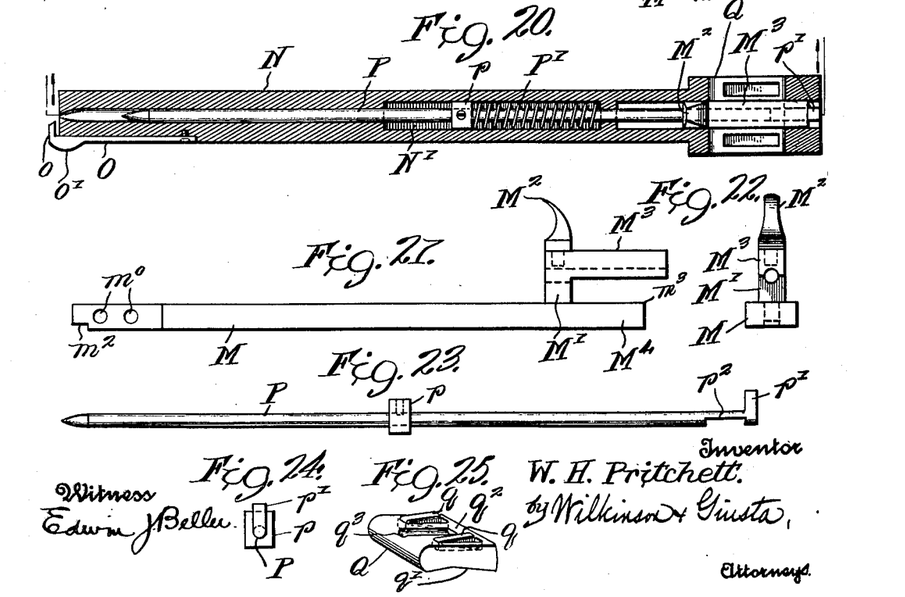
Fig. 20 shows a section through the breech bolt along the line 20—20 of Fig. 18, and looking down, the extractor, firing pin and cocking piece being shown in plan.
Fig. 21 is a detail showing the slide and cocking piece in side elevation.
Fig. 22 is an end view of the device shown in Fig. 21, as seen from the right.
Fig. 23 is a detail showing the firing pin with its spring removed.
Fig. 24 is a rear view of the firing pin as seen from the right in Fig. 23.
Fig. 25 is a perspective view of the locking block, with its springs mounted therein.

This piston rod H' is secured to the union piece K in any suitable way, as by means of the bolt passing through the hole $h$ in the piston rod H'. The union piece is forked as at $k$, and is provided with bolt holes $k^0$ to receive bolts passing through said holes, and also through the holes $m^0$ in the slide M, which slide is reciprocated in the receiver by means of the motor piston, and carries an upward extension M', to which the cocking piece $M^2$ is connected, as shown in Figs. 18 and 21. This slide is provided with an extension $M^3$ in rear of the cocking piece to draw back the firing pin, and with a rearward retracting extension $M^4$, as will be hereinafter described.

Mounted above this slide, and also reciprocating in the receiver is the breech bolt N. The forward end of the breech bolt is provided with strengthening and guide ribs $n$, which reciprocate in guide grooves in the receiver. One of these ribs is cut away slightly to permit the insertion of the stem of the extractor O, as shown in Figs. 4, 14 and 20.

The breech bolt is bored axially to receive the firing pin P, whose spring P' is mounted in the chamber N' in the breech bolt, and the said spring engages against a collar $p$ on the firing pin, and tends normally to press the firing pin forward to the firing position.

Figure 19:
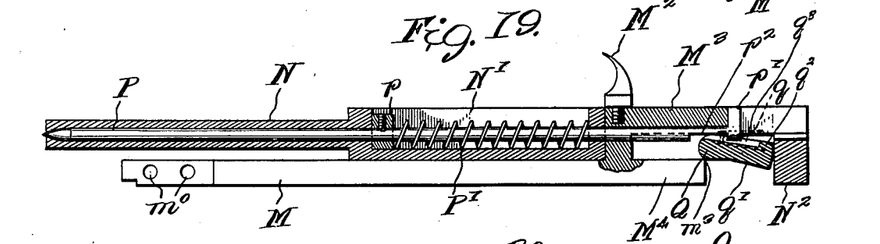
Fig. 19 is a similar view, showing the breech bolt and firing pin in the forward position, the receiver being omitted from Figs. 18 and 19.

The rear end of the breech bolt is provided with a downwardly projecting lug $N^2$ in rear of the locking notches $n^2$, see Figs. 17, 18 and 19. In these notches $n^2$ the locking block Q engages, and this block is normally pressed downward to the position shown in Figs. 3 and 19 by the U-springs $q$. This locking block has a lower cam face $q'$ adapted to be struck by the upper rear edge of the slide M, as will be hereinafter described.

Figures 3, 4:
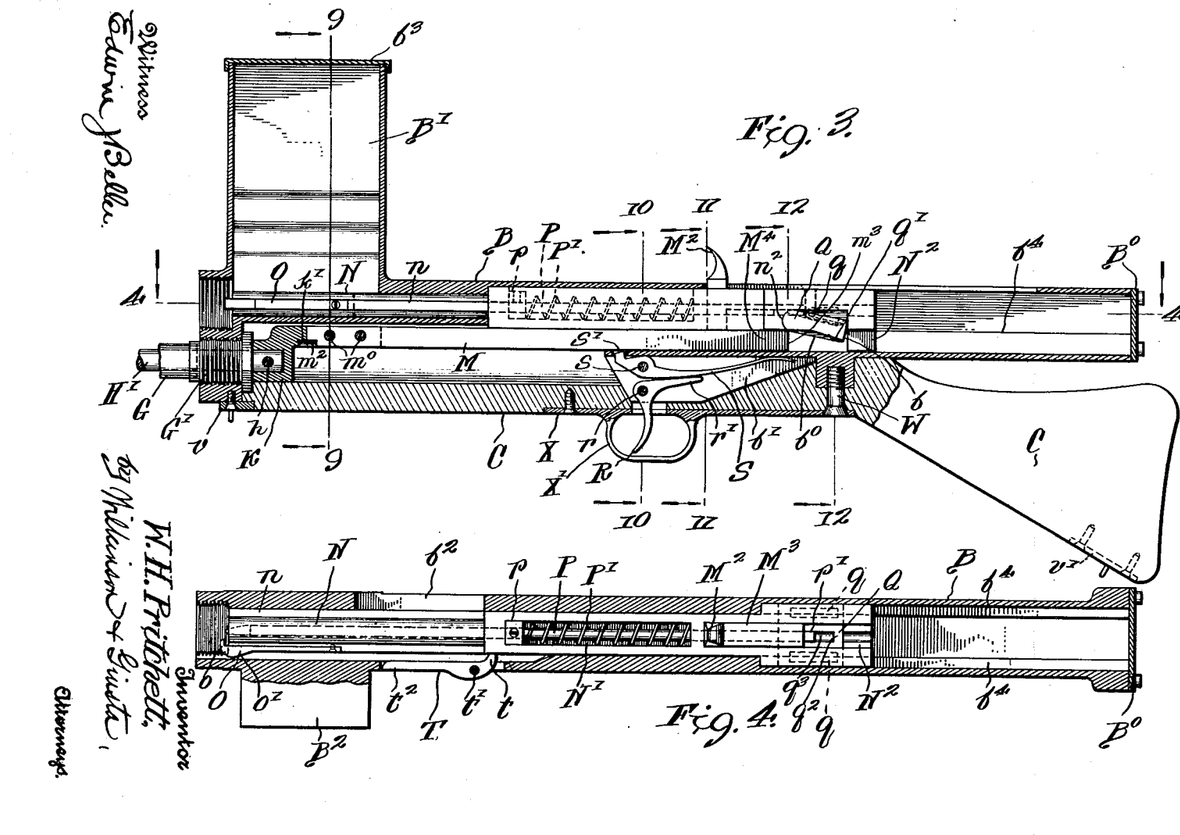
Fig. 3 shows a central vertical section through the stock and the receiver, showing the breech bolt in the forward and locked position, the parts being shown in elevation.
Fig. 4 shows a section through the receiver along the line 4—4 of Fig. 3, and looking down; the stock being omitted in this view for the sake of clearness in the drawings.
Figure 3A:
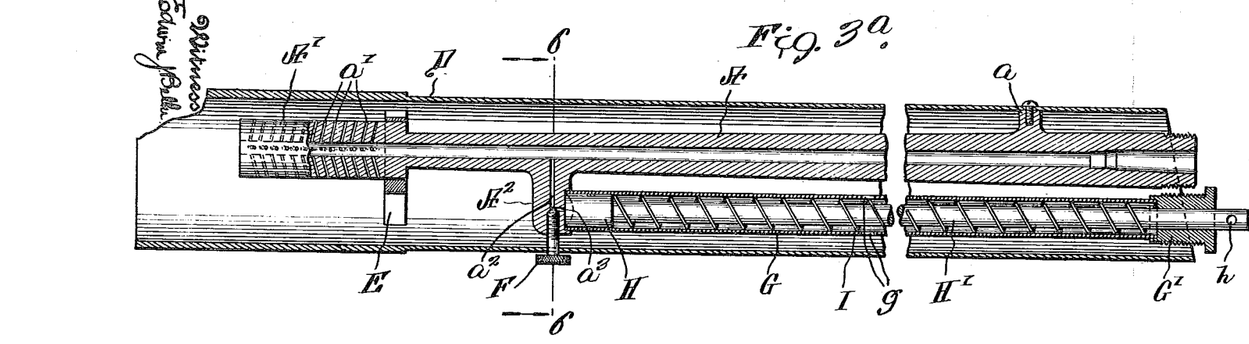
Figure 4:
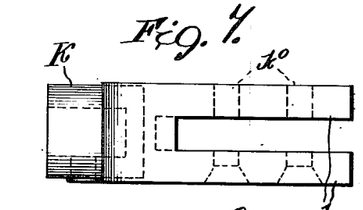
Figures 13, 14, 15, 16:
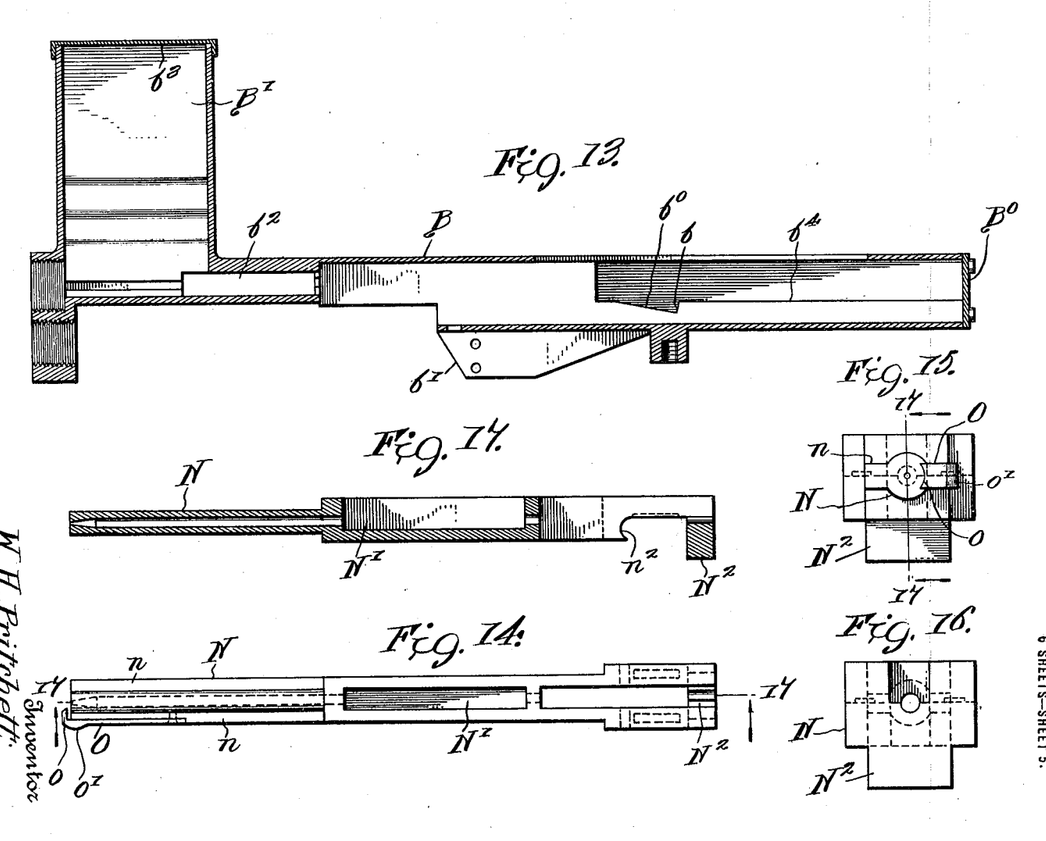
Fig. 13 is a detail showing a central vertical section through the receiver and feed hopper, as detached from the piece.
Fig. 14 is a plan view of the reciprocating breech bolt, with the extractor connected thereto.
Fig. 15 is a front elevation of the breech bolt as detached from the piece; shown on a larger scale, as with Figs. 7 and 8.
Fig. 16 is a rear elevation of the breech bolt, on the same scale as with Fig. 15.

When the breech bolt is in the forward position, the springs $q$ snap the block Q down into the notch $b^0$ in the receiver B, causing its heel to engage the shoulder $b$ of the receiver, as shown in Figs. 3 and 13.

The heel of the firing pin is provided with a lug $p'$, which projects upwardly, and is adapted to engage the rear of the cocking extension $M^3$ on the slide, whereby the firing pin is drawn to the rear to the cocked position.

The firing pin is also slotted beneath its heel as at $p^2$ to engage the rib $q^2$ at the upper rear end of the locking block Q, when the breech bolt is in any but the closed and locked position. The upper surface of the locking block is provided with a groove $q^3$ to permit the free travel of the firing pin.

Figure 12:
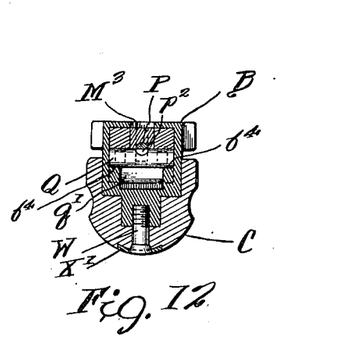
Fig. 12 shows a section along the broken line 12—12 of Fig. 3, and looking in the direction of the arrows.

The locking block is wider than the extension $M^4$ of the slide (see Figs. 3, 4, and 12), and projects into a recess $b^4$ in the receiver, and brings up against shoulders $b$ in the receiver, when the breech bolt is in the forward and locked position.

The trigger R is pivoted as at $r$ to the downwardly projecting webs $b'$ of the receiver B, and the arm $r'$ of the trigger piece engages the sear S, which is pivoted as at $s$ to the webs $b'$, as shown in Fig. 3. The sear has a lug $s'$ which projects through a slot in the bottom of the receiver and engages the notch $m^2$ (see Fig. 3) on the slide M and holds the slide in the rearward position until released by the arm $r'$ of the trigger piece R.

The extractor O has a claw $o$ adapted to engage the cartridge case, and the cam face $o'$ adapted to strike the toe $t$ of the ejector T, which is pivoted at $t'$ to the side of the receiver, as shown in Fig. 4, and the arm $t^2$ of the ejector tends to throw the empty cartridge case through the ejection slot $b^2$ in the receiver, as shown in Figs. 4 and 13.

The cartridges are fed in through the hopper B' which is secured to, or preferably integral with, the receiver. The hopper is provided with any suitable cover $b^3$. The hopper is preferably of the shape shown in section in Fig. 9, so that the cartridges may feed freely one by one, and without interference with each other, into the loading chamber in the receiver.

Figure 5:
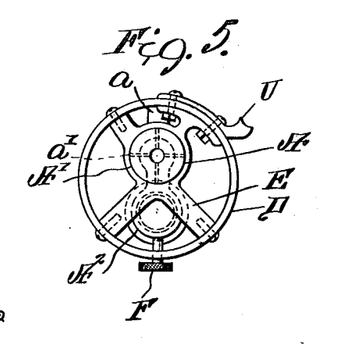
Fig. 5 shows a front view of the barrel and casing as seen from the muzzle.
Figure 6:
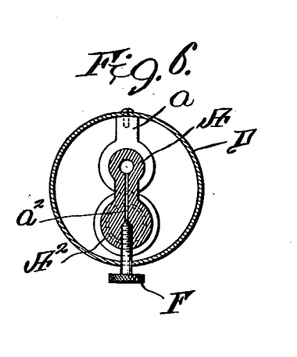
Fig. 6 shows a section through the gas vent and shows the valve for controlling the same in elevation, the section being along the line 6—6 of Fig. 3ª.
Figure 8:
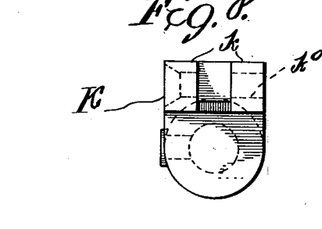
Fig. 8 is a view of the piece shown in Fig. 7, as seen from the right of said figure.
Figure 9:
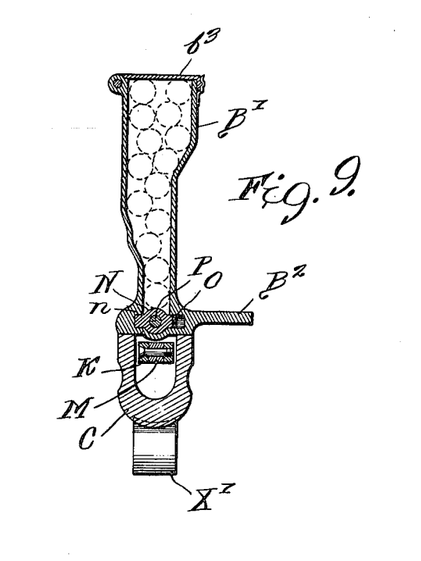
Fig. 9 shows a section along the line 9—9 of Fig. 3, and looking in the direction of the arrows.
Figure 10:
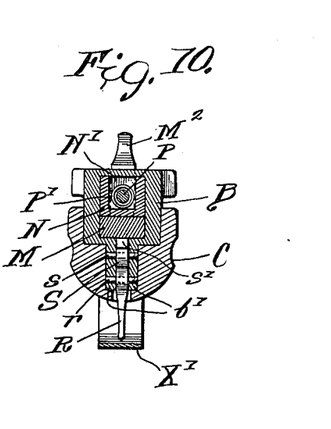
Fig. 10 shows a section along the line 10—10 of Fig. 3, and looking in the direction of the arrows, the sear and trigger being shown in elevation.
Figure 11:
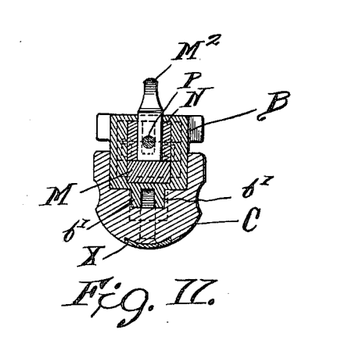
Fig. 11 shows a section along the line 11—11 of Fig. 3, and looking in the direction of the arrows, the sear being omitted.

Suitable sights are provided, such as the front sight U, shown in Figs. 1 and 5, and a rear sight, not shown, which is mounted on the rib $B^2$, projecting on the side of the receiver, as shown in Figs. 1, 4 and 9. I do not claim any special invention in the rear sight, as these are well known in the art, and the rear sight itself is omitted for the sake of clearness in the drawings.

A suitable sling V and brackets $v$ and $v'$ therefor carried by the stock, as shown in Figs. 1, 2 and 3, should preferably be provided for convenience in carrying the piece.

The screw W is used to connect the stock to the receiver and also to connect the plate X carrying the trigger guard X' to the stock.

The operation of the rifle is as follows:

Suppose the magazine hopper to be filled with cartridges, the bolt to be locked in the forward or firing position, and the chamber of the barrel empty. In this position the front end of the bolt is flush with the rear end of the barrel, and the firing pin point protrudes slightly through the front end of the bolt.

Now pull the hand cocking piece $M^2$ to the rear. The first effect is that the slide, the piston rod, the piston, and the firing pin move to the rear, the firing pin being carried to the rear by the cocking extension $M^3$ on the slide, which engages the lug $p'$ of the firing pin, thus compressing the firing pin spring P' by means of the firing pin collar $p$.

In its rearward travel, the rear edge $m^3$ of the retracting extension $M^4$ of the slide strikes the cam surface $q'$ on the lower face of the locking block Q, rocking the locking block upward and out of the locking notches $b^0$ on both sides of the receiver.

It will be seen that the locking block is somewhat wider than the retracting extension on the slide, which will give locking surface on both sides of the receiver.

When the retracting extension $M^4$ reaches the rear end of the locking block, this block is clear of the locking notches $b^0$, and the bolt is unlocked, and is free to travel to the rear.

The firing pin has now been forced to the rear until the rear end of the firing notch $p^2$ is slightly in rear of the rear end of the locking block Q. The locking block is now in a horizontal position, and the rib $q^2$ engages the firing notch $p^2$ in the firing pin. The retracting extension $M^4$ of the slide now strikes the retracting lug $N^2$ on the bolt and forces the bolt to the rear.

If an empty cartridge case has been in the chamber, it would be pulled to the rear by the extractor O, and when the bolt is in its rear position the empty cartridge case would be ejected by the ejector T, through the ejection slot $b^2$.

The bolt is stopped in its rear position either by the action of the main spring I, or by striking the rear plate $B^0$ of the receiver.

When the slide and the breech bolt, propelled rearward by it, are in the rearward position, the lug $s'$ of the sear will engage in the notch $m^2$ of the slide, thus holding the slide, the bolt and the firing pin in the rearward position.

The lower cartridge in the feed hopper has now dropped into the receiver in front of the bolt, and the piece is now ready for automatic firing.

In order to fire the piece, the trigger is pulled to the rear, which draws the sear lug $s'$ out of the notch $m^2$, releasing the slide and the parts driven thereby.

The main spring I now carries the piston, piston rod, and the union piece K, and the slide M forward.

The firing pin follows for a short distance when the firing notch $p^2$ takes against the rib $q^2$ on the locking bolt Q, and further forward movement of the firing pin relative to the breech bolt is arrested, and the two parts move together for the time being. The slide now continues forward, the upward extension M' thereof traveling in its slot in the breech bolt until it takes against the forward end of this slot, as shown in Fig. 4. The slide carries the bolt forward, to the firing position.

When the bolt has reached its forward or firing position, the rear end of the locking block is just over the locking notches $b^0$, and the lock Q is forced downward by the spring $q$. This locks the bolt, and at the same time throws the rib $q^2$ of the locking block out of engagement with the notch $p^2$ of the firing pin, when the firing pin is released and flies forward, exploding the cartridge.

When the bullet passes the gas vent $a^2$ in the barrel, powder gas enters the vent and flows into the cylinder G, forcing the motor piston H backward, and compressing the main spring, forcing the piston rod, union piece and slide to the rear. The entire cycle of operations above described is now repeated until the magazine hopper is empty, or the trigger is released.

The amount of gas entering the gas vent is regulated by the valve F. The cylinder G is perforated as at $g$ near its forward end to allow the gas to escape after doing the work of forcing the piston to the rear.

In order to fire single shot by hand, it will be sufficient to close the valve F, thus shutting off the admission of gas to the cylinder G, when the slide may be drawn to the rear by hand by means of the cocking piece $M^2$; and when in the rear position, the gun may be fired by simply pulling on the trigger, which will release the slide, and will permit the main spring I to move the slide and with it the breech bolt and firing pin to the forward or firing position, the operation of the parts being precisely the same as when firing automatically.

The barrel is cooled by the rush of air inside the casing and around the barrel and motor piston.

The recoil is checked by the gases escaping through the passages $a'$ of the recoil check A'. The function of the recoil check is not so important for single shot firing, but during automatic fire, the recoil check greatly lessens the vibration of the piece, and enables more accurate aim to be made.

In order to prevent rattling, the seat of the recoil check $A^2$ in the spider E may be lined with asbestos. This will also permit the radial expansion and contraction of that portion of the barrel.

The rear plate $B^0$ may be perforated if desired to prevent air cushioning when the slide and the breech bolt are in the rear position.

It will be noted that the dropping of the locking block Q will not only lock the breech bolt in the forward position, but will also release the firing pin, and therefore the piece cannot be fired until the breech bolt is locked in the forward position.

The rifle is assembled as follows:

Place the firing pin collar $p$ and the spring P' in the slot in the breech bolt, then insert the firing pin from the rear until its point projects just forward of the nose of the breech bolt, as shown in Fig. 4. Then set up on the collar a set screw, the firing pin being slightly countersunk to receive the point of the set screw.

Now place the locking block and the locking springs in their respective seats, as shown in Fig. 25, hold the locking block in place by hand, and put the slide in place from the bottom side of the bolt, the upright portion M' and the cocking extension $M^3$ of the slide passing through the corresponding slot of the bolt. The bolt and slide attached are now slipped into the receiver from the rear. The hand cocking piece $M^2$ is now screwed into the slide. The rear plate $B^0$ is put on, and the barrel is now screwed into its seat in the front end of the receiver; then put the main spring on the piston rod, and place the piston and rod with the main spring in the cylinder G. Place the cylinder in position, with the piston rod protruding under the front end of the receiver, and the front end of the cylinder engaging in the counter-sunk portion in the rear face of the gas vent lug $A^2$, as shown in Fig. 3ᵃ. Now slide the cylinder and the main spring plug G' over the rear end of the piston rod and screw this plug G' into its seat beneath the receiver, as shown in Fig. 3.

Now put the union piece K on the rear end of the piston rod and clamp the same into position. Now draw the slide to the forward position and insert the set screws for securing the slide to the union piece. Now put the stock in place, the forward end taking under the bracket $v$, and insert the screw W.

The outer casing of the barrel is now slipped over the muzzle with the re-inforced end forward, and is secured in place. The gas regulator valve F is now screwed in place, passing through the hole in the outer casing, as shown in Fig. 3ᵃ, and the piece is ready for firing.

The rifle can be chambered to use any ammunition in which the major portion of the cartridge case is cylindrical, or near cylindrical, and which has no protruding rim at its base. It can, therefore, use the service ammunition of the U. S. Army, Navy and Marine Corps.

It will be obvious that various modifications might be made in the herein described invention, and in the construction, combination and arrangement of parts, which could be used without departing from the spirit of my invention.

Having thus described my invention, what I claim and desire to secure by Letters Patent of the United States is:

1. In an automatic gun, the combination with a barrel and receiver connected thereto, of a breech bolt mounted to reciprocate in said receiver, a spring-impressed firing pin slidably mounted in said breech bolt, a gas cylinder with a gas vent connecting said cylinder to the interior of said barrel, a motor piston mounted in said cylinder and provided with a piston rod and return spring, a slide connected to said piston rod adapted to reciprocate in said receiver, means operated by the said slide for reciprocating said breech bolt, and for cocking and releasing said firing pin, an extractor carried by said breech bolt, and an ejector pivoted in said receiver and operated by said extractor, substantially as described.

2. In an automatic gun, the combination with a barrel and receiver connected thereto, provided with locking notches on each side thereof, of a breech bolt mounted to reciprocate in said receiver, and provided with a locking block hinged thereto, adapted to engage in said notches when the breech bolt is in the firing position, a spring-impressed firing pin slidably mounted in said breech bolt, a gas cylinder with a gas vent connecting said cylinder to the interior of said barrel, a motor piston mounted in said cylinder and provided with a piston rod and return spring, a slide connected to said piston rod adapted to reciprocate in said receiver, and means including the said block operated by the said slide for reciprocating said breech bolt, and for cocking and releasing said firing pin, substantially as described.

3. In an automatic gun, the combination with a barrel and receiver connected thereto, provided with locking notches on each side thereof, of a breech bolt mounted to reciprocate in said receiver, and provided with a locking block hinged thereto, adapted to engage in said notches when the breech bolt is in the firing position, a spring-impressed firing pin slidably mounted in said breech bolt, a gas cylinder with a gas vent connecting said cylinder to the interior of said barrel, a motor piston mounted in said cylinder and provided with a piston rod and return spring, a slide connected to said piston rod adapted to reciprocate in said receiver, and means including the said block operated by the said slide for reciprocating said breech bolt, and for cocking and releasing said firing pin, an extractor carried by said breech bolt, and an ejector pivoted in said receiver and operated by said extractor, substantially as described.

4. In an automatic gun, the combination with a barrel and receiver connected thereto, provided with locking notches on each side thereof, of a breech bolt mounted to reciprocate in said receiver, and provided with a locking block hinged thereto, springs carried by said block for causing it to engage in said notches when the breech bolt is in firing position, a spring-impressed firing pin slidably mounted in said breech bolt, a gas cylinder with a gas vent connecting said cylinder to the interior of said barrel, a motor piston mounted in said cylinder and provided with a piston rod and return spring, a slide connected to said piston rod adapted to reciprocate in said receiver, and means including the said block operated by the said slide for reciprocating said breech bolt, and for cocking and releasing said firing pin, substantially as described.

5. In an automatic gun, the combination with a barrel and receiver connected thereto, provided with locking notches on each side thereof, of a breech bolt mounted to reciprocate in said receiver, and provided with a locking block hinged thereto, springs carried by said block for causing it to engage in said notches when the breech bolt is in the firing position, a spring-impressed firing pin slidably mounted in said breech bolt, a gas cylinder with a gas vent connecting said cylinder to the interior of said barrel, a motor piston mounted in said cylinder and provided with a piston rod and return spring, a slide connected to said piston rod adapted to reciprocate in said receiver, and means including the said block operated by said slide for reciprocating said breech bolt, and for cocking and releasing said firing pin, an extractor carried by said breech bolt, and an ejector pivoted in said receiver and operated by said extractor, substantially as described.

6. In an automatic gun, the combination with a barrel and receiver connected thereto, provided with locking notches on each side thereof, of a breech bolt mounted to reciprocate in said receiver, and provided with a locking block hinged thereto, adapted to engage in said notches when the breech bolt is in the firing position, the said block being also provided with a transverse rib on its upper face, a spring-impressed firing pin slidably mounted in said breech bolt, and provided with a notch in its heel adapted to enagage said rib, a gas cylinder with a gas vent connecting said cylinder to the interior of said barrel, a motor piston mounted in said cylinder and provided with a piston rod and return spring, a slide connected to said piston rod adapted to reciprocate in said receiver, and means including the said block operated by the said slide for reciprocating said breech bolt, and for cocking and releasing said firing pin, substantially as described.

7. In an automatic gun, the combination with a barrel and receiver connected thereto, provided with locking notches on each side thereof, of a breech bolt mounted to reciprocate in said receiver, and provided with a locking block hinged thereto, adapted to engage in said notches when the breech bolt is in the firing position, the said block being also provided with a transverse rib on its upper face, a spring-impressed firing pin slidably mounted in said breech bolt, and provided with a notch in its heel adapted to engage said rib, a gas cylinder with a gas vent connecting said cylinder to the interior of said barrel, a motor piston mounted in said cylinder and provided with a piston rod and return spring, a slide connected to said piston rod adapted to reciprocate in said receiver, and means including the said block operated by the said slide for reciprocating said breech bolt, and for cocking and releasing said firing pin, an extractor carried by said breech bolt, and an ejector pivoted in said receiver and operated by said extractor, substantially as described.

8. In an automatic gun, the combination with a barrel and receiver connected thereto, provided with locking notches on each side thereof, of a breech bolt mounted to reciprocate in said receiver, and provided with a locking block hinged thereto, the said block being also provided with a transverse rib on its upper face, springs carried by said block for causing it to engage in said notches when the breech bolt is in the firing position, a spring-impressed firing pin slidably mounted in said breech bolt, and provided with a notch in its heel adapted to engage said rib, a gas cylinder with a gas vent connecting said cylinder to the interior of said barrel, a motor piston mounted in said cylinder and provided with a piston rod and return spring, a slide connected to said piston rod adapted to reciprocate in said receiver, and means including the said block operated by the said slide for reciprocating said breech bolt, and for cocking and releasing said firing pin, substantially as described.

9. In an automatic gun, the combination with a barrel and receiver connected thereto, provided with locking notches on each side thereof, of a breech bolt mounted to reciprocate in said receiver, and provided with a locking block hinged thereto, springs carried by said block for causing it to engage in said notches when the breech bolt is in the firing position, the said block being also provided with a transverse rib on its upper face, a spring-impressed firing pin slidably mounted in said breech bolt, and provided with a notch in its heel adapted to engage said rib, a gas cylinder with a gas vent connecting said cylinder to the interior of said barrel, a motor piston mounted in said cylinder and provided with a piston rod and return spring, a slide connected to said piston rod adapted to reciprocate in said receiver, and means including the said block operated by the said slide for reciprocating said breech bolt, and for cocking and releasing said firing pin, an extractor carried by said breech bolt, and an ejector pivoted in said receiver and operated by said extractor, substantially as described.

10. In an automatic gun, the combination with a barrel and receiver connected thereto provided with locking notches on each side thereof, of a longitudinally slotted breech bolt mounted to reciprocate in said receiver, and provided with a locking block pivoted thereto, and with a downwardly projecting lug in rear of said block, springs carried by said block for causing it to engage in said notches when the breech bolt is in the firing position, a spring-impressed firing pin slidably mounted in said breech bolt, and provided with a cocking lug on the heel thereof, a gas cylinder with a gas vent connecting said cylinder to the interior of said barrel, a motor piston mounted in said cylinder and provided with a piston rod and return spring, a slide connected to said piston rod provided with a vertical arm, having a limited play in said slot in the breech bolt and an upper rearward extension to engage the cocking lug of the firing pin, and with a lower rearward extension to lift said block about its pivot and to engage said lug on the breech bolt, substantially as described.

11. In an automatic gun, the combination with a barrel and receiver connected thereto, provided with locking notches on each side thereof, of a longitudinally slotted breech bolt mounted to reciprocate in said receiver, and provided with a locking block pivoted thereto, and with a downwardly projecting lug in rear of said block, springs carried by said block for causing it to engage in said notches when the breech bolt is in the firing position, the said block being also provided with a transverse rib on its upper face, a spring-impressed firing pin slidably mounted in said breech bolt, and provided with a cocking lug on the heel thereof, and also provided with a notch in its heel adapted to engage said rib, a gas cylinder with a gas vent connecting said cylinder to the interior of said barrel, a motor piston mounted in said cylinder and provided with a piston rod and return spring, a slide connected to said piston rod, provided with a vertical arm having a limited play in said slot in the breech bolt and an upper rearward extension to engage the cocking lug of the firing pin, and with a lower rearward extension to lift said block about its pivot and to engage said lug on the breech bolt, substantially as described.

12. In an automatic gun, the combination with a barrel and receiver connected thereto provided with locking notches on each side thereof, of a longitudinally slotted breech bolt mounted to reciprocate in said receiver, and provided with a locking block pivoted thereto, and with a downwardly projecting lug in rear of said block, springs carried by said block for causing it to engage in said notches when the breech bolt is in the firing position, a spring-impressed firing pin slidably mounted in said breech bolt, and provided with a cocking lug on the heel thereof, a gas cylinder with a gas vent connecting said cylinder to the interior of said barrel, a motor piston mounted in said cylinder and provided with a piston rod and return spring, a slide connected to said piston rod, provided with a notch near the forward end thereof, and provided with a vertical arm, having a limited play in said slot in the breech bolt and an upper rearward extension to engage the cocking lug of the firing pin, and with a lower rearward extension to lift said block about its pivot and to engage said lug on the breech bolt, a sear having a lug adapted to engage said notch when the slide is in its rearward position, and a trigger engaging said sear and adapted to withdraw said lug from said notch, substantially as described.

13. In an automatic gun, the combination with a barrel and receiver connected thereto, provided with locking notches on each side thereof, of a longitudinally slotted breech bolt mounted to reciprocate in said receiver, and provided with a locking block pivoted thereto, and with a downwardly projecting lug in rear of said block, springs carried by said block for causing it to engage in said notches when the breech bolt is in the firing position, the said block being also provided with a transverse rib on its upper face, a spring-impressed firing pin slidably mounted in said breech bolt, and also provided with a cocking lug on the heel thereof, and also provided with a notch in its heel adapted to engage said rib, a gas cylinder with a gas vent connecting said cylinder to the interior of said barrel, a motor piston mounted in said cylinder and provided with a piston rod and return spring, a slide connected to said piston rod, provided with a notch near the forward end thereof, provided with a vertical arm having a limited play in said slot in the breech bolt and an upper rearward extension to engage the cocking lug of the firing pin, and with a lower rearward extension to lift said block about its pivot and to engage said lug on the breech bolt, a sear having a lug adapted to engage said notch when the slide is in its rearward position, and a trigger engaging said sear and adapted to withdraw said lug from said notch, substantially as described.

14. In an automatic gun, the combination with a barrel and receiver connected thereto provided with locking notches therein, of a longitudinally slotted breech bolt mounted to reciprocate in said receiver, and provided with a locking block pivoted thereto, and with a downwardly projecting lug in rear of said block, the said block having a cam face on the bottom thereof, springs carried by said block for causing it to engage in said notches when the breech bolt is in the firing position, a spring-impressed firing pin slidably mounted in said breech bolt, and provided with a cocking lug on the heel thereof, a gas cylinder with a gas vent connecting said cylinder to the interior of said barrel, a motor piston mounted in said cylinder and provided with a piston rod and return spring, a slide connected to said piston rod provided with a vertical arm, having a limited play in said slot in the breech bolt and an upper rearward extension to engage the cocking lug of the firing pin, and with a lower rearward extension to engage said cam face and swing said block about its pivot and then to engage said lug on the breech bolt, substantially as described.

15. In an automatic gun, the combination with a barrel and receiver connected thereto provided with locking notches therein, of a longitudinally slotted breech bolt mounted to reciprocate in said receiver, and provided with a locking block pivoted thereto, and with a downwardly projecting lug in rear of said block, the said block having a cam face on the bottom thereof, springs carried by said block for causing it to engage in said notches when the breech bolt is in the firing position, the said block being also provided with a transverse rib on its upper face, a spring-impressed firing pin slidably mounted in said breech bolt, and provided with a cocking lug on the heel thereof, and also provided with a notch in its heel adapted to engage said rib, a gas cylinder with a gas vent connecting said cylinder to the interior of said barrel, a motor piston mounted in said cylinder and provided with a piston rod, provided with a vertical arm having a limited play in said slot in the breech bolt and an upper rearward extension to engage the cocking lug of the firing pin, and with a lower rearward extension to engage said cam face and swing said block about its pivot and then to engage said lug on the breech bolt, substantially as described.

16. In an automatic gun, the combination with a barrel and receiver connected thereto provided with locking notches therein, of a longitudinally slotted breech bolt mounted to reciprocate in said receiver, and provided with a locking block pivoted thereto, and with a downwardly projecting lug in rear of said block, the said block having a cam face on the bottom thereof, springs carried by said block for causing it to engage in said notches when the breech bolt is in the firing position, a spring-impressed firing pin slidably mounted in said breech bolt, and provided with a cocking lug on the heel thereof, a gas cylinder with a gas vent connecting said cylinder to the interior of said barrel, a motor piston mounted in said cylinder and provided with a piston rod and return spring, a slide connected to said piston rod, provided with a notch near the forward end thereof, and provided with a vertical arm, having a limited play in said slot in the breech bolt and an upper rearward extension to engage the cocking lug of the firing pin, and with a lower rearward extension to engage said cam face and swing said block about its pivot and then to engage said lug on the breech bolt, a sear having a lug adapted to engage said notch when the slide is in its rearward position, and a trigger engaging said sear and adapted to withdraw said lug from said notch, substantially as described.

17. In an automatic gun, the combination with a barrel and receiver connected thereto and a feed hopper on said receiver, of a breech bolt mounted to reciprocate in said receiver, a spring-impressed firing pin slidably mounted in said breech bolt, a gas cylinder with a gas vent, connecting said cylinder to the interior of said barrel, a motor piston mounted in said cylinder and provided with a piston rod and return spring, a slide connected to said piston rod adapted to reciprocate in said receiver, and means operated by the said slide for reciprocating said breech bolt, and for cocking and releasing said firing pin, an extractor carried by said breech bolt, and an ejector pivoted in said receiver and operated by said extractor, substantially as described.

18. In an automatic gun, the combination with a barrel, and receiver connected thereto, of a breech bolt mounted to reciprocate in said receiver, a spring-impressed firing pin slidably mounted in said breech bolt, a gas cylinder with a gas vent connecting said cylinder to the interior of said barrel, a motor piston mounted in said cylinder and provided with a piston rod and return spring, a slide connected to said piston rod adapted to reciprocate in said receiver, the said slide being provided with a notch on its lower face near the forward end thereof, a sear having a lug adapted to engage in said notch when the slide is in the rearward position, a trigger adapted to release said sear, means operated by the said slide for reciprocating said breech bolt, and for cocking and releasing said firing pin, an extractor carried by said breech bolt, and an ejector pivoted in said receiver and operated by said extractor, substantially as described.

19. In an automatic gun, the combination with a barrel, and receiver connected thereto, provided with locking notches on each side thereof, of a breech bolt mounted to reciprocate in said receiver, and provided with a locking block hinged thereto, and adapted to engage in said notches when the breech bolt is in the firing position, a spring-impressed firing pin slidably mounted in said breech bolt, a gas cylinder with a gas vent connecting said cylinder to the interior of said barrel, a motor piston mounted in said cylinder and provided with a piston rod and return spring, a slide connected to said piston rod adapted to reciprocate in said receiver, the said slide being provided with a notch on its lower face near the forward end thereof, a sear having a lug adapted to engage in said notch when the slide is in its rearward position, a trigger adapted to release said sear, means operated by the said slide for reciprocating said breech bolt, and for cocking and releasing said firing pin, an extractor carried by said breech bolt, and an ejector pivoted in said receiver and operated by said extractor, substantially as described.

In testimony whereof, I affix my signature.

WILLIAM H. PRITCHETT.